United States Patent [19]

Kondo

[11] Patent Number: 5,746,948
[45] Date of Patent: May 5, 1998

[54] WATER-DILUTIVE AND CONDUCTIVE COATING COMPOSITION CAPABLE OF AFFORDING DESIRED COLOR TONE

[75] Inventor: Yosuke Kondo, Amagasaki, Japan

[73] Assignee: Shinto Paint Co., Ltd., Amagasaki, Japan

[21] Appl. No.: 729,533

[22] Filed: Oct. 11, 1996

[30] Foreign Application Priority Data

Dec. 7, 1995 [JP] Japan .................. 7-345530

[51] Int. Cl.$^6$ .................................................. H01B 1/20
[52] U.S. Cl. ............................ 252/519.33; 252/520.1
[58] Field of Search .................... 252/518, 519, 252/520, 521, 518.1, 519.33, 520.1; 106/436, 441, 455

[56] References Cited

U.S. PATENT DOCUMENTS

| | | | |
|---|---|---|---|
| 4,373,013 | 2/1983 | Yoshizumi | 428/570 |
| 4,655,966 | 4/1987 | Guillauman et al. | 252/518 |
| 5,001,542 | 3/1991 | Tsukagoshi et al. | 357/68 |
| 5,320,781 | 6/1994 | Stahlocker et al. | 252/518 |

*Primary Examiner*—Mark Kopec
*Attorney, Agent, or Firm*—Wenderoth, Lind & Ponack

[57] ABSTRACT

The present invention provides a water-dilutive and conductive coating composition capable of preparing any desired color tone which, upon applying to a thing to be coated, affords various beautiful color tones, gives electroconductivity and prevents static electricity and particularly offers a composition capable of preparing any desired color which can be effectively used in a place where the use of organic solvents and chemical contamination are strictly restricted such as factories for the manufacture of semiconductors. The invention provides a water-dilutive and conductive coating composition whereby any desired color can be afforded, characterized in that, said composition contains 10–50% by weight of water-soluble or water-dispersible synthetic resin (non-volatile content) and 5–40% by weight of white electroconductive pigment and the amount of each of sodium and potassium, in the resulting coated film is not more than 30 ppm.

1 Claim, No Drawings

WATER-DILUTIVE AND CONDUCTIVE COATING COMPOSITION CAPABLE OF AFFORDING DESIRED COLOR TONE

TECHNICAL FIELD

The present invention relates to a water-dilutive and conductive coating composition capable of affording desired color tone whereby, when said composition is applied to a thing to be coated, it affords various beautiful color tones, gives electro-conductivity and prevents static electricity. More particularly, it relates to a water-dilutive and conductive coating composition capable of affording desired color tone which can be effectively used in a place where the use of organic solvents and chemical contamination are strictly restricted such as in factories for the manufacture of semiconductors.

PRIOR ART

In clean rooms in an electronics industry, not only particle contamination but also chemical contamination due to metal ions, etc. have been now regarded as important factors in the control of degree of cleanliness of air for affecting the yield as a result of increasingly high integration of semiconductor memory.

Conductive paint which is applied with an object of preventing static electricity and affording desired color up to now is that of a solvent dilutive type and the corresponding water-dilutive and conductive paint has not been practically used yet.

In addition, water-dilutive paint which has been commonly used contains a lot of alkali metals and releases much ion such as sodium (hereinafter, referred to as Na), potassuim (hereinafter, referred to as K), etc. from the resulting coat.

Problems to be Solved by the Invention

Conventional solvent-dilutive and conductive paints as mentioned above contain various organic solvents and, therefore, they have problems in terms of safety and health during manufacture and coating at job sites and also of environmental pollution due to a release of organic solvents. Moreover, the conventional water-dilutive paints have no antistatic function and release much ion from the coat and, due to the bad affection by them, there is a problem that they cannot be used in semiconductor factories, etc. Further, when they are used for a beautiful finish in addition to for antistatic coat, it is not possible to afford desired color tone since the conductive paints containing metal powder and carbon black as electroconductive pigments are in black to gray color.

Means to Solve the Problems

The present inventors have carried out various investigations for solving the above-mentioned problems in the conventional solvent-dilutive and conductive coating compositions and water-dilutive paints and found a water-dilutive and conductive coating composition which can be diluted with water, can afford desired color tone and makes the release of Na and K small provided that water-soluble or water-dispersible synthetic resin wherein the contents of Na and K are controlled or white electro-conductive pigment wherein the contents of Na and K are controlled is used. Thus, the present invention relates to a water-dilutive and conductive coating composition whereby any desired color can be afforded, characterized in that, said composition contains 10–50% by weight of water-soluble or water-dispersible synthetic resin (non-volatile content) and 5–40% by weight of white conductive pigment and the amount of each of Na and K in the resulting coated film is not more than 30 ppm.

EMBODIMENTS OF THE INVENTION

The water-soluble or water-dispersible synthetic resin used in the present invention is a synthetic resin in which the amount of each of Na and K is controlled. Its examples are polyester resin, vinyl acetate resin, Veova resin, acryl resin, acrylstyrene resin, epoxy resin and epoxyester resin which may be suitably selected upon the object of the use. Its amount in the coating composition is 10–50% by weight as a non-volatile content. The amount of each of Na and K in the coated film may be not more than 30 ppm and, if a resin (non-volatile content: 50%) containing 60 ppm of Na is used in a coating composition (non-volatile paint content: 50%) in an amount of 25% by weight as a non-volatile content, the amount of Na resulted from the resin in the coated film is as high as 60 ppm which may cause chemical contamination whereby the composition cannot be used. However, when a resin (non-volatile content: 50%) containing 20 ppm of Na is used, amount of Na resulted from the resin in the coated film used in the same amount is 20 ppm and the final composition can be satisfactorily used if the amount of Na in other starting materials is not more than 10 ppm. This is same for K as well. Then, when the amount of synthetic resin is less than 10% by weight, formation and maintenance of coated film are difficult while, when it is more than 50% by weight, stable electroconductivity is not achieved whereby both cases as such are not preferred. The white electroconductive pigment used in the present invention is preferably that having a small hiding power for resulting in a desired color tone. For example, the pigment wherein barium sulfate, zinc oxide, titanium oxide, potassium titanate or the like is used as a core followed by doping with antimony wherein tin oxide is a main component or that wherein aluminum, boron, etc. are doped and the surface is coated may be used. Its amount in the coating composition is 5–40% by weight. The amount of each of Na and K in the white electroconductive pigment is calculated by the same manner as in the case of the resin and is controlled, if necessary, by purifying with deionized water before use. When the amount of the white electroconductive pigment is less than 5% by weight, stable electroconductivity is not resulted while, when it is more than 40% by weight, the amount is too much as compared with the amount which is adequate for the required electroconductivity and, in addition, there is no advantage in terms of shelf life, stability in electroconductivity and cost whereby both cases as such are not preferred.

When white to light color is desired in the present invention, it is preferred to use white pigment in addition to the above-mentioned essential components so that good hiding power is achieved. With regard to the white pigment, titanium oxide in which the amount of each of Na and K is controlled is preferred and its amount in the coating composition is 0–70% by weight. The amount of each of Na and K in the white pigment is calculated by the same manner as in the case of the resin and is controlled, if necessary, by purifying with deionized water before use. When the amount of the white pigment is more than 70% by weight, its properties as a paint such as shelf life and workability become poor whereby that is not preferred.

Like common water-dilutive paints, the conductive coating composition of the present invention can also be made into a paint using various kinds of additives. With regard to the additives, dispersing agents, defoamers, pH controlling agents, film forming agents, thickeners, etc. may be suitably used upon necessity.

It is possible to prepare a conductive coating composition of the present invention in desired hue by adding coloring agents which are commonly used in water-dilutive paints such as Disperse Color (manufactured by Dainippon Ink & Chemical Industries, Ltd.) thereto.

EXAMPLES

The present invention will now be specifically illustrated by way of the following examples though the present invention is not limited by them.

Examples 1–5

The components as given in Table 1 were added and mixed in this order (from top to down) with stirring in a polymer container using a stirrer whereupon a conductive coating composition was prepared.

Examples 1–3 are to check the relation between the amount of the electroconductive pigment and the surface resistivity.

Examples 4–5 are the compositions with chromatic color wherein coloring agents are compounded.

Comparative Examples 1–2

The compositions were prepared by the same manner as in Examples 1–5.

Comparative Example 1 is a composition wherein no electroconductive pigment was added.

Comparative Example 2 is a composition wherein common unpurified white pigment where the amount of each of Na and K was not controlled was used.

TABLE 1

| Components | | Examples | | | | | Comp. Ex. | |
|---|---|---|---|---|---|---|---|---|
| | | 1 | 2 | 3 | 4 | 5 | 1 | 2 |
| Deionized Water | *1 | 17 | 17 | 17 | 17 | 17 | 17 | 17 |
| pH Controlling Agent | *2 | 0.1 | 0.1 | 0.1 | 0.1 | 0.1 | 0.1 | 0.1 |
| Defoamer | *3 | 0.6 | 0.6 | 0.6 | 0.6 | 0.6 | 0.6 | 0.6 |
| Dispersing Agent | *4 | 1.3 | 1.3 | 1.3 | 1.3 | 1.3 | 1.3 | 1.3 |
| Film Forming Agent | *5 | 1.0 | 1.0 | 1.0 | 1.0 | 1.0 | 1.0 | 1.0 |
| White Conductive Pigment | *6 | 5 | 15 | 40 | 15 | 15 | — | 15 |
| White Pigment A | *7 | 35 | 25 | — | 25 | 25 | 40 | — |
| White Pigment B | *8 | — | — | — | — | — | — | 25 |
| Resin A | *9 | 40 | 40 | 40 | 40 | 40 | 40 | — |
| Resin B | *10 | — | — | — | — | — | — | 40 |
| Coloring Agent A | *11 | — | — | — | 2.2 | — | — | — |
| Coloring Agent B | *12 | — | — | — | 0.8 | — | — | — |
| Coloring Agent C | *13 | — | — | — | — | 8.0 | — | — |
| Total | | 100 | 100 | 100 | 103 | 108 | 100 | 100 |

Note:
Figures in the Table are parts by weight
*1 Deionized water: having electroconductivity of not more than 1 μS/cm.
*2 pH Controlling Agent: aqueous ammonia solution
*3 Defoamer: BYK-034 (trade name) manufactured by Byk Chemie Japan.
*4 Dispersing Agent: Disperbyk-184 (trade name) manufactured by Byk Chemie Japan.

TABLE 1-continued

| Components | | Examples | | | | | Comp. Ex. | |
|---|---|---|---|---|---|---|---|---|
| | | 1 | 2 | 3 | 4 | 5 | 1 | 2 |

*5 Film Forming Agent: Propylene glycol.
*6 Whiteconductive Pigment: Potassium titanate (wherein a surface treatment was conducted with tin oxide and antimony oxide) (Dentol WK-300 [trade name] manufactured by Otsuka Chemical Co., Ltd. was purified with deionized water until the electroconductivity of the filtrate became not more than 10 μS/cm. Na content: 15 ppm; K content: 15 ppm.)
*7 White Pigment A: Purified titanium oxide (CR-50 [trade name] manufactured by Ishihara Sangyo Kaisha Ltd. was purified with deionized water until the electroconductivity of the filtrate became not more than 10 μS/cm. Na content: 15 ppm; K content: 15 ppm).
*8 White Pigment B: Titanium oxide (CR-50 [trade name] manufactured by Ishihara Sangyo Kaisha, Ltd.; Na content: 150 ppm; K content 130 ppm).
*9 Acryl Emulsion Resin (Deionized water [40 parts by weight] was heated at 80° C. in a reactor wherein air was purged with nitrogen and then monomers, emulsifying agent and initiator were gradually dropped thereinto. The mixture was aged at 80° C. for three hours, cooled and neutralized to give the resin. With regard to the monomers, 15 parts by weight of methyl methacrylate, 10 parts by weight of methacrylic acid, 20 parts by weight of 2-ethylhexyl acrylate and 5 parts by weight of styrene in which the amount of each of Na and K was controlled to not more than 20 ppm each were used. Non-volatile content: 50%; Na content: 15 ppm; K content 10 ppm.)
*10 Acryl Emulsion Resin: (Yodosol [trade name] manufactured by Kanebo-NSC, Ltd.; non-volatile content: 43%; Na content: 180 ppm; K content 250 ppm).
*11 Coloring Agent A: (Disperse Yellow SD-4002 manufactured by Dainippon Ink & Chemical Industries, Ltd.).
*12 Coloring Agent B: (Disperse Brown SD-8034 manufactured by Dainippon Ink & Chemical Industries, Ltd.).
*13 Coloring Agent C: (Disperse Black SD-569 manufactured by Dainippon Ink & Chemical Industries, Ltd.).

The coating compositions having the compounding ratio as given in Table 1 were applied to an acryl plate using an applicator so as to make a film of 20 μm thickness (after dried) and surface resistivity, hue, eluted amounts of Na and K and applicability to clean rooms for the manufacture of semiconductors were checked. The results are given in Table 2.

TABLE 2

| Results | Examples | | | | | Comp. Ex. | |
|---|---|---|---|---|---|---|---|
| | 1 | 2 | 3 | 4 | 5 | 1 | 2 |
| Surface Resistivity (ohms/sq.) *14 | $4.0 \times 10^9$ | $5.0 \times 10^6$ | $7.0 \times 10^5$ | $5.0 \times 10^6$ | $5.0 \times 10^6$ | $>10^{12}$ | $5.0 \times 10^6$ |
| Hue | w | w | w | be | bl | w | w |
| Eluted Amounts (ppm) *15 | | | | | | | |
| for Na | 20 | 20 | 20 | 25 | 30 | 20 | 300 |
| for K | 15 | 15 | 15 | 20 | 25 | 15 | 300 |
| Applicability to Clean Room *16 | o | o | o | o | o | x1 | x2 | w: white; be: beige; bl: blue
*14 Surface Resistivity (ohms/sq.): Measurement was conducted using a Hirester IP HT-210 (manufactured by Yuka Denshi Co., Ltd.).
*15: With regard to the amounts of Na and K ions released from the coated film, the coated film was dipped in deionized water for 24 hours and then the amounts of Na and K contained in the water after removing the coated film therefrom were measured by means of atomic absorption analysis.
*16: o—applicable in a clean room
x1—not applicable because of lack of electroconductivity and antistatic effect
x2—not applicable because of much Na and K concentrations causing chemical contamination

MERIT OF THE INVENTION

It is apparent from the above-mentioned descriptions and tables that the conductive coating composition of the present invention is a water-dilutive and conductive coating composition which is capable of affording any desired color tone and releases only small amounts of Na and K from the resulting coated film. Accordingly, it is now possible to offer a conductive coating composition which has a high safety upon actual application in actual job site and is suitable for applying to factories for the manufacture of semiconductors.

What I claim is:

1. A water-dilutive and conductive coating composition which contains 10–50% by weight of water-soluble or water-dispersible synthetic resin as non-volatile content and 5–40% by weight of white electroconductive pigment with regard to non-volatile content of the coating composition and the amount of each of sodium and potassium in the coating composition is not more than 30 ppm.

* * * * *